2,835,709

PROCESS FOR THE PRODUCTION OF PENTA-ERYTHRITOL TRICHLOROHYDRIN

Hans-Joachim Mann, Offenbach (Main), Germany, assignor to Deutsche Gold- und Silber-Scheideanstalt vormals Roessler, Frankfurt, Germany No Drawing. Application February 11, 1955
Serial No. 487,706

Claims priority, application Germany February 18, 1954

4 Claims. (Cl. 260—633)

The present invention relates to an improved process for the production of pentaerythritol trichlorohydrin from pentaerythritol and hydrogen chloride at elevated temperatures and pressures.

It is already known that when pentaerythritol and hydrogen chloride are heated in a bomb tube to temperatures between 120° and 180° C., a mixture of pentaerythritol monochlorohydrin, pentaerythritol dichlorohydrin and pentaerythritol trichlorohydrin are produced in varying proportions (H. Fecht, Berichte 40, pages 3888–89, 1907). However, the commercial production of pentaerythritol trichlorohydrin in good yields without the formation of considerable quantities of by-products was not possible with such a process.

In accordance with the invention it has been found that pentaerythritol trichlorohydrin could be obtained in good yields by reacting pentaerythritol with at least 3 mols, preferably 5 to 10 mols, of hydrogen chloride, which expediently is dried under superatmospheric pressure at temperatures between 150° and 200° C. in the presence of at least about $\frac{1}{10}$ mol of a lower aliphatic monocarboxylic acid or an ester of such an acid, for example, formic acid, acetic acid or ethyl acetate.

It is of advantage when the reaction is carried out in the presence of an inert organic solvent for the pentaerythritol trichlorohydrin which is produced. Such solvents for example are benzene, toluene, xylene, hexane and the like.

The maintenance of the indicated temperatures and proportions of the reactants indicated above is essential for the success of the process. When temperatures below 150° C. are employed, pentaerythritol dichlorohydrin is produced as the main product. At temperatures above 200° C. the pentaerythritol decomposes to some degree with a corresponding substantial reduction in the yield. The use of at least 3 mols of hydrogen chloride per mol of pentaerythritol is necessary as with lower quantities of hydrogen chloride pentaerythritol dichloro- and monochlorohydrin are produced as the main products.

When the reaction is carried out in the absence of the catalytic monocarboxylic acid or the esters thereof the reaction also does not proceed in the desired manner. When less than $\frac{1}{10}$ mol of the acid or ester are employed the main product again is pentaerythritol dichlorohydrin.

It is also possible according to the invention to carry out the reaction in the presence of greater quantities, for example, more than 1 mol per mol of pentaerythritol, of the carboxylic acids or their esters. When such larger quantities are employed the corresponding monoesters of pentaerythritol trichlorohdrin are produced which can then be saponified to produce the free pentaerythritol trichlorohydrin in a manner known per se. In this modification of the process according to the invention it is expedient to carry out the reaction in the absence of an added inert solvent.

A certain period of time is required for the reaction. At 160° C. the formation of pentaerythritol trichlorohydrin starts after about 1 hour and ends after about 2 hours.

The pentaerythritol trichlorohydrin can be recovered from the reaction mixture produced in the usual manner, for example, by distillation. Pentaerythritol trichlorohydrin is a valuable starting material for the production of synthetic resins.

The following examples will serve to illustrate several modifications of the process according to the invention:

*Example 1*

136.1 g. of pentaerythritol were introduced into a silver plated autoclave and suspended in a mixture of 500 cc. of benzene and 6 cc. of glacial acetic acid. Thereafter 400 g. of dry HCl were introduced into the autoclave with stirring or shaking. The autoclave was then heated to 200° C. for 2 hours with intensive agitation of the contents. After cooling, the excess HCl was drawn off and the crystalline pentaerythritol trichlorohydrin was filtered off with vacuum from the reaction mixture. For further purification the product was recrystallized from a small quantity of carbon tetrachloride containing active carbon. The filtrate from the reaction mixture was distilled under normal pressure to distill off the benzene contained therein and the residue was distilled under vacuum. At 9 mm. Hg at temperatures between 120 and 139° C. pentaerythritol trichlorohydrin distilled over first, followed by a mixture of pentaerythritol trichlorohydrin and pentaerythritol trichlorohydrin monoacetate. This mixture can be separated by filtration and the free trichlorohydrin can be recovered from the monoacetate by saponification with 20% aqueous NaOH.

The total yield of pentaerythritol trichlorohydrin was 121 g.=63% and had a melting point of 63–65° C.

*Example 2*

136.1 g. of pentaerythritol was heated in admixture with 400 cc. of benzene, 100 cc. of glacial acetic acid and 300 g. of dry HCl in a silver plated autoclave for 2 hours at 160–170° C. The resulting reaction mixture was composed of two layers. The upper layer was taken off and first distilled at normal pressure and then under vacuum. The pentaerythritol trichlorohydrin monoacetate produced distilled over at 130–135° C. at a pressure of 9 mm. Hg. It was a colorless liquid $n_D^{20}=1.4844$.

The yield of pentaerythritol trichlorohydrin monoacetate was 194 g. which is 83% of the theoretical with reference to the pentaerythritol.

The monoacetate was then heated for 1 hour at 100° C. with constant stirring with 167 cc. of 20% aqueous NaOH. After cooling, the oily phase was separated from the reaction mixture and crystallized by the addition of a little concentrated hydrochloric acid ($d=1.19$). The resulting free pentaerythritol trichlorohydrin was recrystallized from carbon tetrachloride.

The yield was 153 g. which is 96% of the theoretical based on the pentaerythritol trichlorohydrin monoacetate.

*Example 3*

136.1 g. of pentaerythritol were dissolved in 500 cc. of glacial acetic acid and heated with the addition of 300 g. of dry HCl for 2 hours at 160–165° C. in a silver plated autoclave. After distilling off the glacial acetic acid at normal pressure the residue was fractionated under vacuum.

The yield of pentaerythritol trichlorohydrin monoacetate was 180 g. or 77% of the theoretical based upon pentaerythritol.

The monoacetate was converted to the free trichlorohydrin as described in Example 2.

Example 4

136.1 g. of pentaerythritol were suspended in 500 cc. of ethyl acetate and the suspension heated for 2 hours at 160–170° C. with 500 g. dry HCl in a silver plated autoclave. After distilling off the ethyl chloride which was produced, 165 g. (71% of the theoretical) of pentaerythritol trichlorohydrin monoacetate was recovered by fractional distillation under vacuum. The monoacetate was converted to the free trichlorohydrin as described in Example 2.

Example 5

136.1 g. of pentaerythritol were suspended in 500 cc. of benzene and 4.2 cc. of waterfree formic acid and heated with 300 g. dry HCl in a silver plated autoclave for 2 hours at 160° C. After removal of the excess HCl the reaction mixture was cooled and the crystallized pentaerythritol trichlorohydrin was filtered off and recrystallized from carbon tetrachloride. The filtrate was distilled to remove the solvent therefrom and the residue was distilled under reduced pressure.

The yield of pentaerythritol trichlorohydrin was 132 g. which is 68% of the theoretical.

The pressures observed in the autoclave during the reaction reached 110 to 150 atm. The reaction is preferably carried out under such conditions that the low carboxylic acid and the solvent remain at least to some extent in the liquid phase.

I claim:

1. In a process for the production of pentaerythritol trichlorohydrin from pentaerythritol and hydrogen chloride the step which comprises reacting pentaerythritol and hydrogen chloride in admixture with a catalytic compound selected from the group consisting of lower aliphatic monocarboxylic acids and their lower alkyl esters at a temperature between 150° and 200° C., under a pressure between 110 and 150 atmospheres, the proportion of the hydrogen chloride being at least 3 mols per mol of pentaerythritol and the proportion of the catalytic compound being at least $1/10$ mol per mol of pentaerythritol.

2. The process of claim 1 in which the hydrogen chloride is dry.

3. The process of claim 1 in which said admixture contains an inert solvent for pentaerythritol trichlorohydrin.

4. The process of claim 1 in which the proportion of said catalytic compound is over 1 mol per mol of pentaerythritol and the pentaerythritol trichlorohydrin monocarboxylic acid ester produced is saponified to produce the free pentaerythritol trichlorohydrin.

References Cited in the file of this patent

UNITED STATES PATENTS

| | | |
|---|---|---|
| 2,257,899 | Britton et al | Oct. 7, 1941 |
| 2,763,679 | Dee | Sept. 18, 1956 |

OTHER REFERENCES

Fecht: Ber. Deut. Chem. vol. 40, pp. 3888–9 (1907).